No. 757,938. Patented April 19, 1904.

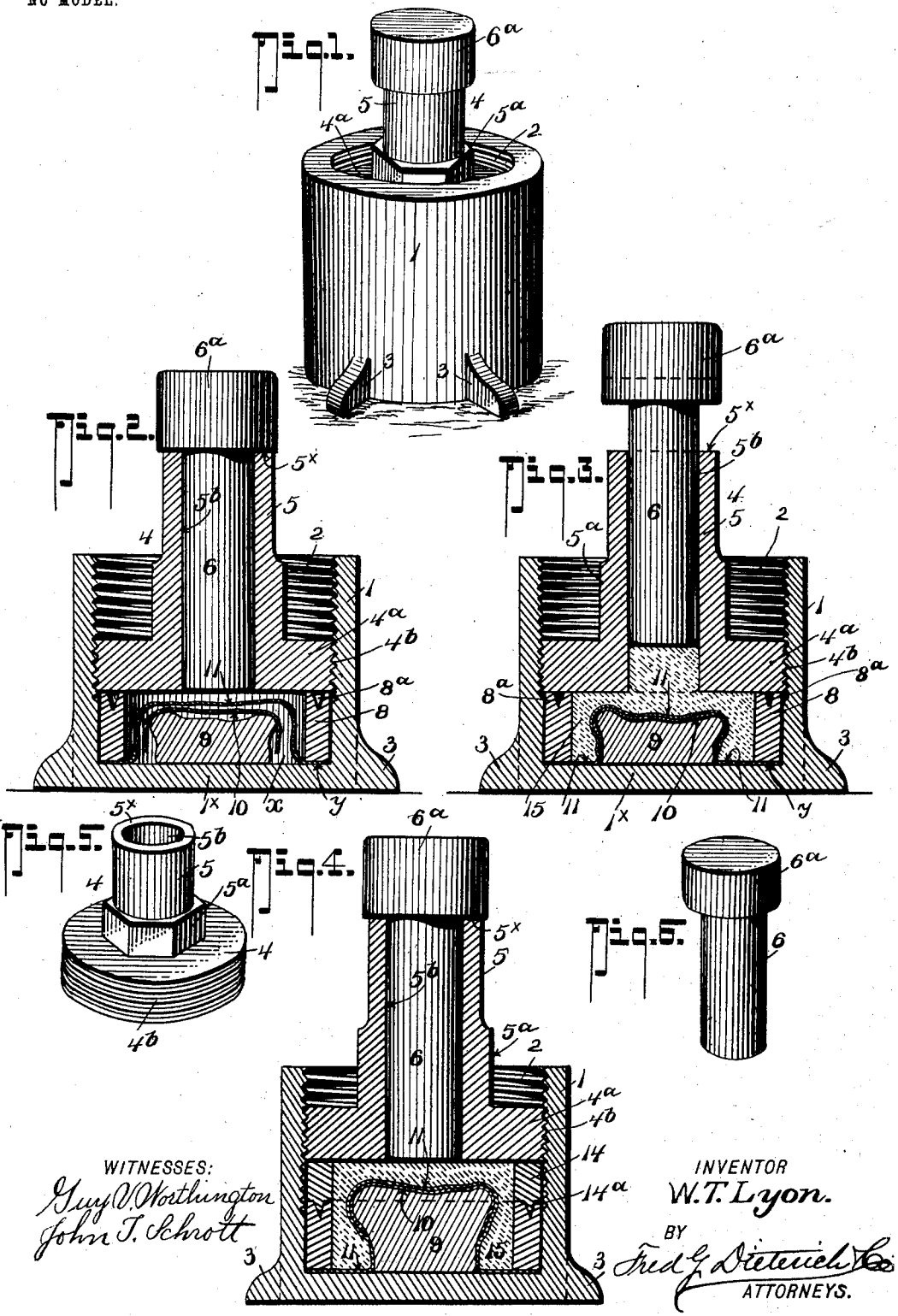

UNITED STATES PATENT OFFICE.

WILLIAM T. LYON, OF PORTLAND, OREGON.

DENTAL APPLIANCE.

SPECIFICATION forming part of Letters Patent No. 757,938, dated April 19, 1904.

Application filed July 8, 1903. Serial No. 164,701. (No model.)

*To all whom it may concern:*

Be it known that I, WILLIAM T. LYON, residing at Portland, in the county of Multnomah and State of Oregon, have invented a new and useful Dental Appliance, of which the following is a specification.

My invention is in the nature of an appliance for making and shaping seamless metal plates for artificial teeth, and primarily has for its object to provide a device of this character of a very simple and inexpensive nature which can be easily manipulated and which will effectively serve for its intended purposes.

Furthermore, my invention seeks to provide an appliance by which the plate can be either produced for the upper or lower mouth in such a manner as to take the correct form thereof.

With other objects in view, which will hereinafter be made clear, the invention consists in an appliance of the character stated embodying a peculiar combination and novel arrangement of parts and such as will be first described in detail and then be specifically pointed out in the appended claims, reference being had to the accompanying drawings, in which—

Figure 1 is a perspective view of my appliance complete. Fig. 2 is a vertical longitudinal section thereof, the parts being in the position they assume prior to the introduction of the pliable filler. Fig. 3 is a similar view showing the filler introduced and the plunger in the position for the application of the final pressure to the filler. Fig. 4 is a similar view of a slightly-modified form, the filler being completely compressed. Fig. 5 is a detail perspective view of the plug, and Fig. 6 is a similar view of the plunger.

In its practical construction my invention embodies a hollow shell or cup 1, constructed, preferably, of cast-iron or some similar material which will withstand the necessary strain.

2 indicates a coarse thread tapped on the inside in the shell or cup 1 and extending about two-thirds its depth, and 3 indicates suitable lugs by which the shell may be held from turning during the operation of inserting the plug and filler, as will presently appear.

Adapted to operate within the shell or cup 1 and close the opening therein is what I term a "plug," (designated generally by 4,) which plug has a piston $4^a$, screw-threaded, as at $4^b$, to engage the threads 2 of the shell or cup 1. Projecting upward from the piston $4^a$ and formed integral therewith is a cylindrical member 5, having a portion $5^a$ flattened, to which a wrench may be applied for forcing the piston downward, as will be hereinafter clearly understood.

$5^b$ designates a central longitudinal bore extending the entire length of the member 5 and the piston 4, into which is loosely fitted a plunger 6, having a head $6^a$, as will clearly appear by reference to Figs. 2, 3, 4, and 6.

Adapted to fit loosely within the shell or cup 1 and rest on the bottom thereof is an annular ring 8, having conical apertures $8^a$ in its upper face.

The cast of the mouth 9 is adapted to be placed within the shell 1, and the sheet-metal blank 10 is placed thereon.

11 represents a sheet of thin yielding material—such as cloth, rubber, and the like—which is placed over the cast and blank for the purposes presently to appear.

So far as described, the operation of my invention will be thus explained as follows: The plug 4, together with the plunger 6 and the ring 8, is removed from the shell or cup 1, after which the cast 8 is placed within the shell 1, with its cast or forming side up. The sheet-metal blank 10 is then placed over the cast 9, after which the cast 9, together with the blank 10, is covered with the yielding cover 11, which, it should be stated, is of such a size and shape as to completely cover the cast 9 and blank 10 and bottom $1^x$ of the shell. The annular ring 8 is next placed within the shell or cup 1 to seat upon the edge of the yielding cover 11 by firmly holding it in place. After the ring 8 is in position the plug $4^a$ is inserted and screwed down tightly upon the ring 8, and thereby firmly holds the ring 8 and yielding cover 11 in place. The plunger 6 is then removed, and the filler of some soft pliable substance 15—such as soap, wax, putty, and the like—is inserted in the bore 5ᵇ and worked down by means of plunger 6 until the chamber x is filled and securely packed, enough of the pliable substance 15 remaining in the bore 6ᵇ to fill it to the depth of about one-half inch. (See Fig. 3.) The plunger 6 is inserted, as shown in Fig. 1, and struck several blows with a hammer or sledge until the head of the plunger 6 rests upon the edge 5ˣ of the cylindrical member 5, (see Fig. 6,) when the pliable substance will have forced the blank to snugly fit the cast 9. When the cast 9 is of such size as to project above the upper edge of the ring 8, a supplemental ring 14, having pins 14ᵃ to fit apertures 8ᵃ of the ring 8, is placed upon the ring 8, as shown in Fig. 4. After the blank has been swaged in place the plug is unscrewed and removed from the shell or cup 1. The pliable material, with the ring 8, cast 9, form-plate, &c., is removed from the shell or cup 1. The ring 8 is then separated from the pliable substance, and by pulling the edge y of the yielding cover it, together with the pliable substance 15, can be readily removed from the cast and the form-plate, which plate is then removed from the cast in any approved manner.

While I prefer to construct my invention as shown and described, yet I desire it understood that slight changes and modifications may be made therein without departing from the scope of the appended claims.

By constructing my invention as shown and described it will be seen I am enabled to apply greatly-increased pressure upon the filler of pliable material, and thereby more certainly and accurately form the blank into the sheet desired.

Having thus described my invention, what I claim, and desire to secure by Letters Patent, is—

1. An appliance of the character stated, comprising a shell or cup having an internal screw-threaded bore, said cup adapted to receive the cast and a blank, a yieldable cover for said cast and blank, a ring to fit within the shell or cup and adapted to rest upon the periphery of the yieldable cover to hold the same in place and a threaded plug for closing the said internal bore of the shell adapted to seat upon the ring for holding the same in place, substantially as shown and described.

2. An appliance of the character stated comprising a shell or cup having an internal screw-threaded bore, said cup adapted to receive the cast and the blank, a yieldable covering for said cast and blank, a ring to fit within the shell or cup and adapted to rest upon the periphery of the yieldable covering, to hold the same in place, a threaded plug for closing said internal bore of the shell and adapted to seat upon the ring for holding the same in place, said plug including an upwardly-extending portion having an internal bore as and for the purposes described.

3. In an appliance of the character stated, a shell or cup having an internal screw-threaded bore, said cup being adapted to receive the cast and the blank, a yieldable covering for said cast and blank, a ring to fit within the shell or cup and adapted to rest upon the periphery of the yieldable covering to hold the same in place, a plug having a threaded portion for coöperating with the threaded bore of the shell for closing the said internal bore of the shell and adapted to seat upon the ring for holding the same in place, said plug including an upwardly-extending portion having an internal bore throughout its length, a plunger to fit said bore and adapted to operate therein for the purposes specified.

4. A dental appliance comprising a shell or cup 1 internally threaded as at 2 and adapted to receive the cast 9 and the blank 10, a shield 11, the shield securing the ring 8, a plug 4 having a threaded piston 4ᵃ, and the extension 5 internally bored as at 5ᵇ, and the plunger 6, all being arranged substantially as shown and for the purposes described.

5. An appliance of the character stated comprising a cup-shaped shell having an internally-threaded upper end and adapted to receive the cast and the blank therefor, a yieldable covering for the said cast and blank, a ring within the shell adapted to rest upon the peripheral edge of the covering to hold it in place over the cast and blank thereon, a plunger which includes a threaded piston for closing and engaging the threaded end of the shell, said plunger also including a vertical extension, said extension having a central opening that extends through the piston end of the plunger, and a plug operable in the said central opening of the said plunger, as set forth.

WILLIAM T. LYON.

Witnesses:
A. T. LEWIS,
F. T. BERRY.